United States Patent Office 3,310,528
Patented Mar. 21, 1967

3,310,528
NEW EPOXIDE RESINS, PROCESSES FOR THEIR PRODUCTION AND HARDENABLE COMPOSITIONS CONTAINING SUCH EPOXIDE RESINS
Edward William Garnish, Saffron Walden, England, assignor to Ciba Limited, Basel, Switzerland, a company of Switzerland
No Drawing. Filed July 9, 1963, Ser. No. 293,832
Claims priority, application Great Britain, July 12, 1962, 26,891/62
8 Claims. (Cl. 260—47)

This invention relates to epoxide resins, to processes for their production, and to their uses.

Aromatic amines containing one or more active hydrogen atoms attached to nitrogen can be caused to react with epihalohydrins. It has been shown that if the amine is a very weak base, boron trifluoride functions as a catalyst in this reaction. For more strongly basic amines, a long reaction time and/or a solvent system containing hydroxyl groups and facilitating the reaction, e.g. a monohydric alcohol or water, are used. The intermediates are treated with alkali to yield epoxide compounds that are useful commercially.

It is known to prepare glycidyl derivatives from aminophenols and epihalohydrins in the presence of a lithium compound as catalyst, followed by reaction of the intermediate with alkali, especially with an alkali metal hydroixde such as sodium or potassium hydroxide.

It has now been found that useful resins may be prepared from mixtures of aromatic amines and phenols. Because of the catalytic effect of the phenolic hydroxyl groups a rapid, smooth reaction occurs between the aromatic amine and the epihalohydrin.

The present invention accordingly provides a process for the production of a new class of useful epoxide resins containing on average more than 1:2-epoxide group per molecule, which comprises reacting an epihalohydrin with one or more aromatic amines containing, per molecule, at least two hydrogen atoms attached directly to nitrogen and one or more phenols containing at least two phenolic hydroxyl groups per molecule, and dehydrohalogenating the reaction product with alkali, the quantity of alkali being at least equivalent to the amount of amine used.

It is believed that the products comprise copolymers with more than one epoxide group per molecule containing bridges of the partial formula:

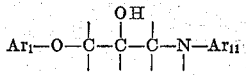

where $Ar_I$ and $Ar_{II}$ are aromatic residues derived from the original phenols and aromatic amines respectively, glycidyl amines, glycidyl ethers, and polymers of the glycidyl amines and ethers. Free phenolic hydroxyl groups may remain in the final product. When, as in a preferred procedure, an excess of epihalohydrin is employed in the initial interaction and then unreacted epihalohydrin is removed before the dehydrohalogenation stage, the aforesaid copolymers constitute a substantial proportion of the resin so obtained.

The resins obtained may be free flowing liquids, viscous resins or fusible, glassy solids, depending on the starting materials, their proportions and the reaction conditions. The new resins are stable on storage at room temperature for long periods and can be cured to form useful infusible products with the types of hardeners used with previously known epoxide resins.

Minor amounts of mono-primary or secondary amines or mono-hydric phenols may be included in the reaction mixture to modify the viscosity of the final resin reaction product, provided that the amount used is not such as to cause the average number of epoxide groups per molecule of the reaction product to fall below one. It is to be understood that such compounds having both amine and phenolic functions may be employed in the starting mixture.

In the first stage of the process, the phenolic compound serves to catalyse the reaction between the aromatic amine and epihalohydrin. The phenol is not removed from the mixture when this reaction is completed, but takes part in the second (dehydrohalogenation) reaction stage.

A catalytic effect on the reaction between aromatic amines and epihalohydrins is observed even when only a small proportion of a phenol is present. It is preferred, for the purposes of this invention, to employ a quantity of phenol corresponding to not less than 1% by weight of the equivalent proportion calculated on the active amine hydrogen present. The following reaction sequence is believed to take place, but the invention does not depend on the truth of this explanation. In the first stage of the reaction a complex tertiary amine is formed, which may act as a catalyst for the reaction between phenolic hydroxyl groups and epihalohydrin. Analytical data, however, support the view that part of the phenol is available to react in the second stage of the process. On addition of alkali, epoxide groups are formed and polymerisation occurs, giving rise to the resins of the invention.

It will be understood that from any particular starting mixture comprising epihalohydrin, aromatic amine, and polyhydric phenol, intermediate mixtures which contain various proportions of halohydrin compounds, phenolic compounds and partially reacted amines can be produced, depending on the properties of reactants and reaction conditions. Since the number of possible combinations of amines and phenols is very large, resins with a wide range of properties may be produced in accordance with the invention. Thus, the physical and chemical characteristics before cure, the reactivity during cure and the physical, electrical and mechanical properties of the hardened products can be varied within wide limits.

Aromatic amines suitable for use in the process include aniline, o- and m-toluidine, m- and p-chloroaniline, p-anisidine, p-phenetidine, p-aminophenol, benzidine and bis-(4-aminophenyl)ketone, but p-toluidine, bis-(4-aminophenyl)methane, bis - (4 - methylaminophenyl)methane and bis-(4-aminophenyl)sulphone are preferred. Phenols suitable for the process include 2,2-bis-(4-hydroxyphenyl) propane (Bisphenol A), 4,4'-dihydroxydiphenylsulphone, resorcinol, hydroquinone, phloroglucinol, tetrakis-(4-hydroxyphenyl)ethane and non-hardening novolaks made from phenols and aldehydes, the first three of these being preferred. Mono-functional compounds that may be used in small amounts include N-methylaniline, phenol and o-, m- and p-cresol or other alkylated mono-phenols. Epichlorohydrin is the preferred epihalohydrin because of its ready commercial availability.

The reaction may be carried out at any temperature between 20 C. and 150° C. but is preferably effected at between 35° C. and 80° C. for the first stage and 35° C. to 95° C. for the second (dehydrohalogenation) stage.

In the first stage of the process the aromatic amine reacts with the epihalohydrin. Solvents such as hydrocarbons or ketones may be added to the mixture of aromatic amine, phenol, and epihalohydrin to modify the viscosity of the reaction mixture. This mixture is heated at the chosen reaction temperature. If a product with a high degree of polymerisation is desired, less than an equivalent amount of epihalohydrin may be employed so that unreacted amine remains in the reaction mixture. The preferred methods of controlling the degree of polymerisation, however, are variation of the amine/phenol ratio and variation of reaction parameters such as temperature. Such methods allow the use of an excess of epihalohydrin, which accelerate the rate of reaction and usually renders the use of a solvent in the first stage unnecessary.

The purpose of the second stage of the process is to dehydrohalogenate the intermediate reaction product and to isolate the resin so obtained. This is preferably done as follows. Any excess of epihalohydrin is distilled off. The residue is taken up in a solvent or a mixture of solvents. Suitable classes of solvents are hydrocarbons and lower ketones or alcohols. The solution is reacted with an alkali, preferably an aqueous solution of sodium or potassium hydroxides, in an amount at least sufficient to react with all the reactive halogen in the mixture. The proportion of residual phenolic hydroxyl groups in the product will depend on the reaction conditions in this stage; longer reaction times and higher temperatures favour reaction of phenolic hydroxyl groups with epoxide groups and hence the formation of products of higher molecular weight. The resin is isolated from the reaction mixture by methods familiar to those skilled in the art.

The resins of this invention, either alone or in admixture with other epoxide resins, may be hardened with polybasic acids or acid anhydrides, aromatic or aliphatic polyamines, Lewis acids such as $BF_3$ or complexes of the same, polyhydric phenols or phenolic novolaks, and other hardeners familiar to users of epoxide resins. Compositions comprising a resin produced in accordance with the invention and a hardener for epoxide resins, with or without another epoxide resin, are within the scope of the invention. Such compositions may also contain fillers, plasticisers or colourants, and may be employed in the preparation of castings, encapsulations, laminates, surface coatings, and adhesives or as dough-moulding compositions.

The following examples illustrate the invention. The heat deflection temperatures under load of the products were determined by a modification of the Martens DIN procedure in which a smaller sample is employed. Such results, while not exactly equivalent to those which would be obtained by the original procedure, provide mutually comparable results. Flexural strengths and flexural moduli were determined according to A.S.T.M. specification D. 790–59T.

Example I

A solution of 2,2-bis(4-hydroxyphenyl)propane (45 g., 0.395 equiv.) in epichlorohydrin (440 g., 4.76 equiv.) was held at 70–75° C. whilst bis-(4-aminophenyl)methane (55 g.; 1.11 equiv.) was added over 30 minutes. The reaction mixture was held at this temperature for 3.25 hours. During this time the rate of conversion of the epoxide content was determined by titrating samples of the reaction mixture against a solution of hydrogen bromide in acetic acid (Durbetaki, Anal. Chem. 1956, 28, 2000). The combined amine and epoxy content of the reaction mixture was then estimated. At the end of the reaction period it was 7.42 equiv./kg. The value calculated, assuming that only the amine active hydrogen reacts with the epichlorohydrin, is 7.79 equiv./kg. while, if it is assumed that both amine and phenolic active hydrogen react with epichlorohydrin, the calculated value is 7.06 equiv./kg.

Unreacted epichlorohydrin was distilled off under reduced pressure, the internal temperature of the mixture not exceeding 70° C. and 310 g. of epichlorohydrin were collected. The maximum recoverable, calculated on the basis of complete reaction of the amine active-hydrogen only, is 337 g., whereas that calculated on the basis of reaction of both amine and phenolic active hydrogen is 301 g.

The residue was dissolved in a mixture of toluene-industrial methylated spirit (3:1 by volume) to yield a solution containing 50% dissolved solids. This solution was stirred vigorously with a solution of sodium hydroxide (66 g.) in water (200 g.) for 2 hours at 70° C. The mixture was carefully neutralised and the aqueous layer separated and rejected. The organic layer was evaporated under reduced pressure at an internal temperature not exceeding 130° C. to yield 172 g. of a brown, sticky resin. The epoxide and chlorohydrin values of the product were 5.53 and 0.01 equiv./kg. respectively.

Example II 2,2-(p-hydroxyphenyl)propane (94.5 g., 0.83 equiv.), epichlorohydrin (1155 g., 12.48 equiv.) and bis-(4-aminophenyl)methane (165 g., 3.33 equiv.) were reacted in a manner similar to that described in Example I. In the first stage product a combined amine/epoxide value of 7.66 equiv./kg. was recorded after a reaction time of 3.5 hours. The value calculated, assuming only the amine active hydrogen to have reacted, was 7.65 equiv./kg.

From this experiment, 780 g. of epichlorohydrin were recovered. The maximum recoverable, calculated on the basis of reaction of the amine active hydrogen, is 846 g., while that calculated assuming both amine and phenolic active hydrogen to have reacted is 768 g.

After the second stage, 436 g. of a sticky brown resin were isolated. This resin had an epoxide value of 5.92 equiv./kg. and a chlorohydrin value of 0.02 equiv./kg.

Example III

The preparation described in Example I was repeated except that the second stage reaction was carried out at 50° C. with a reaction time of 1 hour. The resin obtained had an epoxide value of 5.92 equiv./kg. and a chlorohydrin value of 0.07 equiv./kg.

Example IV

The preparation described in Example I was repeated except that the second stage was carried out at the reflux temperature with a reaction time of 4 hours. The resin obtained had an epoxide value of 4.95 equiv./kg. and a negligible chlorohydrin value.

Example V

Resorcinol (21.7 g.; 0.394 equiv.) epichlorohydrin (440 g.; 4.76 equiv.) and bis-(4-aminophenyl)methane (55 g.; 1.11 equiv.) were caused to react at 50° C. in the manner described in Example I. In 6 hours the combined amine/epoxide value dropped to 7.80 equiv./kg. The value calculated, assuming only the amine active hydrogen to have reacted, was 8.14 equiv./kg., while that calculated assuming both the amine and phenolic active hydrogen to have reacted was 7.38 equiv./kg. Some 315 g. of epichlorohydrin was recovered. Assuming only the amine active hydrogen and both the phenolic active and amine active hydrogen to have reacted, the calculated recoveries are 337 g. and 301 g. respectively.

Reaction with a solution of sodium hydroxide (66 g.) in water (200 ml.) was effected at 60° C. over 2 hours. A very viscous amber resin (119 g.) was isolated, having an epoxide value of 7.13 equiv./kg. and chlorohydrin of 0.03 equiv./kg.

Example VI

Bis-(hydroxyphenyl)sulphone (49.4 g.; 0.395 equiv.), epichlorohydrin (440 g.; 4.76 equiv.) and bis-(4-aminophenyl)methane (55 g.; 1.11 equiv.) were reacted as in Example V. A red solid resin (99 g.) was isolated having an epoxide value of 8.13 equiv./kg. and a chlorohydrin value of 0.03 equiv./kg.

Example VII 2,2-bis-(4-hydroxyphenyl)propane (30 g.), phenol (12.4 g.), epichlorohydrin (440 g.) and bis-(4-aminophenyl)methane (55 g.) were reacted at 60° C. in the manner described in Example I. In 4 hours the combined amine/epoxide content had dropped to 7.63 equiv./kg. The content calculated, assuming only the amine active hydrogen content to have reacted, is 7.85 equiv./kg.

After evaporation of the epichlorohydrin and reaction with a solution of sodium hydroxide (66 g.) in water (200 g.) at 60° C. for 2 hours, there was isolated an amber, viscous resin in 172 g. yield. This resin had an epoxide value of 6.52 equiv./kg. and a chlorohydrin value of 0.02 equiv./kg.

*Example VIII*

2,2-bis-(4-hydroxyphenyl)propane (30 g.), p-aminophenol (14.2 g.), epichlorohydrin (509 g.; 5.50 equiv.) and bis-(4-aminophenyl)methane (55 g.) were reacted in the manner outlined in Example VII. In the first stage, after reaction for five hours, the combined amine/epoxide content had dropped to 7.4 equiv./kg. The expected final value, if only amine active hydrogen reacts with epichlorohydrin, is 7.71 equiv./kg.

| Mixture | Epichlorohydrin | p-Toluidine | Toluene (inert diluent), g. | Bisphenol A | Ethylene glycol |
|---|---|---|---|---|---|
| A | 100 g. (1.08 equiv.) | 40.2 g. (0.75 equiv.) | 28.5 | | |
| B | 100 g. (1.08 equiv.) | 40.2 g. (0.75 equiv.) | | 28.5 g. (0.25 equiv.) | |
| C | 100 g. (1.08 equiv.) | 40.2 g. (0.75 equiv.) | 20.7 | | 7.8 g. (0.25 equiv.) |

After evaporation of the epichlorohydrin and the second stage reaction, there were isolated 105 g. of a sticky resin which had an epoxide value of 6.52 equiv./kg. and a chlorohydrin value of 0.02 equiv./kg.

*Example IX*

A solution of 4,4'-diaminodiphenyl sulphone (49.6 g.; 0.2 mol.) and resorcinol (7.8 g.; 0.07 mol.) in epichlorohydrin (77 g.; 0.83 mol) was held at 75° C. for eleven hours. The viscous reaction mixture was taken up in ethyl methyl ketone (144 ml) and stirred vigorously for four hours at 60° C. with aqueous sodium hydroxide (40% w./w.; 85 g.).

From the reaction mixture was isolated in the manner outlined in Example I, a brown solid resin (59 g.) having an epoxide value of 5.03 equiv./kg. and a chlorohydrin value of 0.03 equiv./kg.

*Example X*

A solution of p-toluidine (40 g.; 0.75 equiv.) and Bisphenol A (21.4 g.; 0.188 equiv.) in epichlorohydrin (70 g.; 0.76 equiv.) was held at 60–65° C. for 4.5 hours. The residue was taken up in a mixture of toluene and methoxyethanol (2:1 v./v.; 60 ml.), and the solution stirred vigorously for four hours at 70° C. with aqueous sodium hydroxide (40% w./w.; 90 g.).

From the reaction mixture was isolated, in the manner outlined in Example I, a brown viscous resin (895 g.) having an epoxide value of 4.90 equiv./kg. and a chlorohydrin value of 0.02 equiv./kg.

*Example XI*

A solution of bis-(4-methylaminophenyl)methane (56.5 g.; 0.5 equiv.) and Bisphenol A (14.3 g.; 0.125 equiv.) in epichlorohydrin (47 g.; 0.5 equiv.) was held at 60–65° C. for 4.5 hours. The viscous reaction mixture was taken up in a mixture of toluene and methoxyethanol (2:1 v./v.; 85 ml.) and the solution stirred vigorously for two hours at 70° C. with aqueous sodium hydroxide (40% w./w.; 75 g.).

From the reaction mixture was isolated, in the manner outlined in Example I, a brown very viscous resin (94 g.) having an epoxide value of 3.50 equiv./kg. and a chlorohydrin value of 0.03 equiv./kg.

*Example XII*

This example demonstrates that the rate of reaction in the presence of a polyhydric phenol is faster than when a conventional catalyst (ethylene glycol) is employed. Mixtures having the following composition were prepared:

These mixtures were held at 60° C. and the rate of conversion of the epoxide content was determined by titrating samples of the reaction mixture against a solution of hydrogen bromide in acetic acid. The degree of conversion taking 100% as denoting complete reaction of the amine group, was as follows:

| Mixture | Percent of Conversion after (hours)— | | | | | | | |
|---|---|---|---|---|---|---|---|---|
| | 0.5 | 1.0 | 1.5 | 2.0 | 3.0 | 4.0 | 5.0 | 6.0 |
| A | 5.5 | 7.5 | 8 | 13 | 22 | 36 | 56 | 71.5 |
| B | 76 | 93 | 98.5 | 100.5 | 103 | 104 | 105.5 | 106.5 |
| C | 25 | 45 | 60 | 72.5 | 87 | 93.5 | 94.5 | 98 |

A catalytic effect of almost the same extent was apparent when only about 0.06 equivalent of Bisphenol A was employed.

*Example XIII*

The resins of Example I–XI were cured with methyl-endomethylenetetrahydrophthalic anhydride, using a curing cycle of 1 hour at 120° C. and 4 hours at 220° C. The products had the following properties:

| Resin of Example No. | Equivalent of curing agent per equivalent of epoxide | Heat deflection temperature under load, ° C. | Flexural strength (kg./sq. cm.) | Flexural strength modulus (kg./sq. cm.) |
|---|---|---|---|---|
| I | 0.8 | 268 | | |
| II | 0.8 | 233 | | |
| III | 1.0 | 238 | | |
| IV | 0.8 | 239 | | |
| V | 1.0 | 253 | | |
| VI | 1.2 | 265 | | |
| VII | 1.0 | 211 | | |
| VIII | 1.0 | 253 | | |
| IX | 1.0 | 244 | 1,240 | $4.09 \times 10^4$ |
| X | 1.0 | 131 | 1,220 | |
| XI | 1.0 | 134 | 1,490 | $2.56 \times 10^4$ |

A casting prepared as indicated from the resin of Example IX was exposed to air for 6 weeks at 200° C.; the weight loss was only 3.1%.

For purposes of comparison, a mixture of 2 parts by weight of the N,N,N',N'-tetrakis-(glycidyl) derivative of 4,4-diaminodiphenylmethane and 1 part by weight of Bisphenol A diglycidyl ether, containing approximately the same ratio of ether to amine linkages as the resin of Example I, was cured with one equivalent of methyl-endomethylenetetrahydrophthalic anhydride under the same conditions. The heat deflection temperature under load of the cured product was only 188° C.

What is claimed is:

1. A process for the production of a new epoxide resin containing on average more than one 1:2-epoxide groups per molecule, which comprises
   (a) reacting an epihalohydrin with at least one aromatic amine, free from any carboxyl group and free from any phenolic hydroxyl group, which contains, per molecule, at least two hydrogen atoms attached directly to nitrogen, and at least one phenol containing at least two phenolic hydroxyl groups per molecule, at a temperature within the range 20° C. to 150° C., the epihalohydrin being in molar execess, calculated on the combined amounts of aromatic amine and phenol, (b) distilling off unreacted epihalohydrin from the reaction product, and (c) dehydrohalogenating the reaction product by treatment with alkali at a temperature within the range 20° C. to 150° C., the quantity of alkali being at least equivalent to the amount of amine used.

2. A process for the production of a new epoxide resin containing on average more than one 1:2-epoxide group per molecule, which comprises (a) reacting epichlorohydrin with at least one aromatic amine, free from any carboxyl group and free from any phenolic hydroxyl group, which contains, per molecule, at least two hydrogen atoms atached directly to nitrogen, and at least one phenol containing at least two phenolic hydroxyl groups per molecule, at a temperature within the range 20° C. to 150° C., the epichlorohydrin being in molar excess, calculated on the combined amounts of aromatic amine and phenol, (b) distilling off unreacted epichlorohydrin from the reaction product, and (c) dehydrochlorinating the reaction product by treatment with alkali at a temperature within the range of 20° C. to 150° C., the quantity of alkali being at least equivalent to the amount of amine used.

3. Process as claimed in claim 2, in which the quantity of phenol used corresponds to not less than 10% by weight of the equivalent proportion calculated on the active amine hydrogen present.

4. Process as claimed in claim 2, in which the initial reaction is carried out at 35° to 80° C. and the subsequent dehydrochlorination is carried out at 35° to 95° C.

5. Process as claimed in claim 2, in which the phenol used is one of the group consisting of 2,2-bis-(4-hydroxyphenyl)propane, 4,4'-dihydroxydiphenylsulfone and resorcinol.

6. Process as claimed in claim 2, in which the amine used as one of the group consisting of p-toluidine, bis-(4 - aminophenyl)methane, 4,4'-diaminodiphenylsulfone and bis-(4-methylaminophenyl)methane.

7. Epoxide resins produced by (a) reacting epichlorohydrin with at least one aromatic amine, free from any carboxyl group and free from any phenolic hydroxyl group, which contains, per molecule, at least two hydrogen atoms attached directly to nitrogen, and at least one phenol containing at least two phenolic hydroxyl groups per molecule, at a temperature within the range 20° C. to 150° C., the epichlorohydrin being in molar excess, calculated on the combined amounts of aromatic amine and phenol, (b) distilling off unreacted epichlorohydrin from the reaction product, and (c) dehydrochlorinating the reaction product by treatment with alkali at a temperature within the range 20° C. to 150° C., the quantity of alkali being at least equivalent to the amount of amine used.

8. Hardenable compositions comprising an epoxide resin produced by (a) reacting epichlorohydrin with at least one aromatic amine, free from any carboxyl group and free from any phenolic hydroxyl group, which contains, per molecule, at least two hydrogen atoms attached directly to nitrogen, and at least one phenol containing at least two phenolic hydroxyl groups per molecule, at a temperature within the range 20° C. to 150° C., the epichlorohydrin being in molar excess, calculated on the combined amounts of aromatic amine and phenol, (b) distilling off unreacted epichlorohydrin from the reaction product, and (c) dehydrochlorinating the reaction product by treatment with alkali at a temperature within the range 20° C. to 150° C., the quantity of alkali being at least equivalent to the amount of amine used and also comprising a hardener for epoxide resins.

References Cited by the Examiner

UNITED STATES PATENTS 2,951,825   9/1960   Reinking et al. __ 260—348 XR

FOREIGN PATENTS 818,218   8/1959   Great Britain.
907,844   10/1962   Great Britain.

WILLIAM H. SHORT, Primary Examiner.

T. D. KERWIN, Assistant Examiner.